United States Patent

[11] 3,591,210

[72] Inventor Ricahrd E. Heise
    Miami, Fla.
[21] Appl. No. 853,414
[22] Filed Aug. 27, 1969
[45] Patented July 6, 1971
[73] Assignee Automated Building Components
    Miami, Fla.
    Continuation-in-part of application Ser. No.
    755,673, Aug. 27, 1968, now Patent No.
    3,485,518.

[54] DOUBLE-ENDED RING FASTENER AND JOINT THEREWITH
    17 Claims, 6 Drawing Figs.
[52] U.S. Cl. ................................................ 287/20.92,
    52/483, 85/13, 85/14
[51] Int. Cl. ...................................................... F16b 5/00,
    F16b 15/00
[50] Field of Search .......................................... 85/14, 13,
    11, 49; 287/20.92 L; 52/483, DIG. 6

[56] References Cited
    UNITED STATES PATENTS
    300,536   6/1884   Walker ........................ 85/11

| | | | |
|---|---|---|---|
| 2,084,544 | 6/1937 | Wilson | 85/14 X |
| 2,495,337 | 1/1950 | Lindham | 85/14 |
| 2,558,132 | 6/1951 | Green | 85/14 |
| 3,485,518 | 8/1968 | Heise | 287/20.92 L.P. |

FOREIGN PATENTS

| | | | |
|---|---|---|---|
| 490,541 | 2/1953 | Canada | 287/20.92 L.P. |
| 188,331 | 2/1924 | Great Britain | 85/11 |
| 494,131 | 10/1938 | Great Britain | 85/14 |

Primary Examiner—Ramon S. Britts
Attorney—Leblanc and Shur

ABSTRACT: The double-ended fastener comprises an elongated sheet metal body having a plurality of longitudinally spaced teeth extending in opposite lateral directions in the plane of the body. The fastener is formed into a ringlet with each tooth being planar, the ringlet being thereby polygonally shaped. The tips of the teeth are bent outwardly of the planes thereof, and upon imbedment cause the teeth to clinch outwardly to form a secure joint. The fastener is disposed between a stud and sheet paneling. The paneling is pressed toward the stud to imbed the teeth of the fastener into the stud and paneling thereby securing one to the other.

PATENTED JUL 6 1971 3,591,210
FIG. 1
FIG. 4
FIG. 3
FIG. 2
FIG. 5
FIG. 6
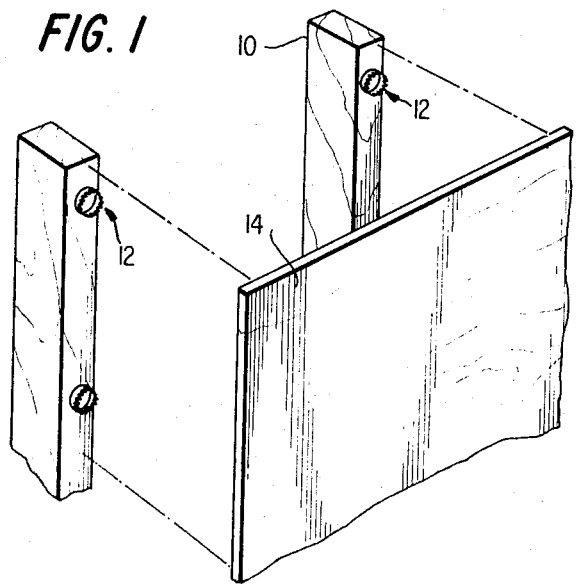
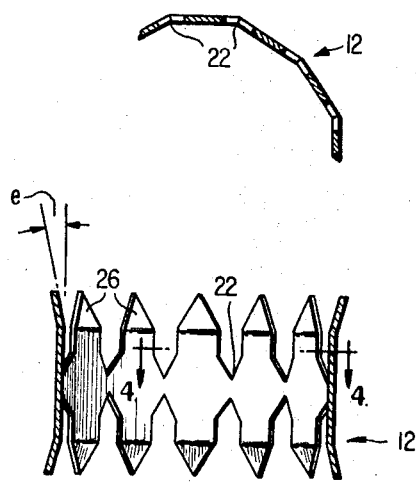
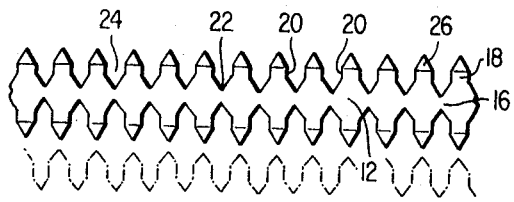
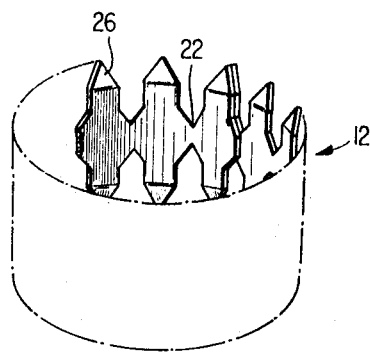
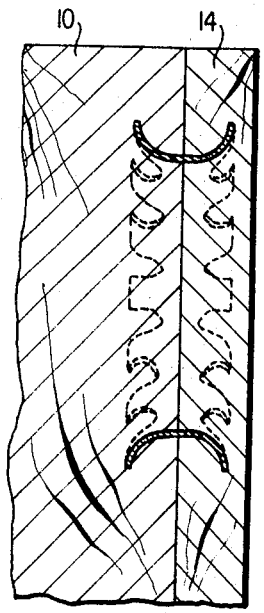
INVENTOR
RICHARD E. HEISE
BY  Le Blanc & Shur
ATTORNEYS

DOUBLE-ENDED RING FASTENER AND JOINT THEREWITH

This application is a continuation-in-part of my copending application Ser. No. 755,673, filed Aug. 27, 1968, now Pat. No. 3,485,518.

The present invention relates to a fastener for joining butting members one to the other and particularly relates to a double ended hidden fastener for joining sheet paneling to studding.

Many types of fasteners have been proposed and constructed for joining two or more members each to the other. Most fasteners are of the type which are driven through one member into one or more of the other members or into the side portions of each member simultaneously. In each case, portions of the fastener remain fully exposed. This is undesirable, particularly in finished joints, as the exposed portions of the fasteners detract from the appearance of the joints and must be painted over or otherwise covered.

A number of fasteners have heretofore been proposed and constructed wherein the fasteners are completely hidden from view. One such fastener comprises an elongated, transversely corrugated, steel strip having sharpened longitudinal edges whereby the fastener may be disposed between the members to be joined, and the members pressed together to imbed the sharpened corrugations into the opposed members. Corrugated fasteners of this type, however, do not provide adequate withdrawal resistance, and the joined members can be separated with minimum force. Further, such fasteners undesirably shear the wood.

Another type of hidden fastener comprises an elongated strip of metal formed to provide triangularly shaped prongs or teeth along opposite edges thereof. The triangular teeth on one side of the fastener are longitudinally offset from the triangular teeth on the opposite side of the fastener such that the tips of the teeth on one side of the fastener lie in transverse alignment with the spaces between adjacent teeth on the other side. This fastener has not proved completely satisfactory as the triangular type teeth do not provide adequate resistance to withdrawal, particularly if utilized in soft paneling, and the members again may be separated with minimum force. Additionally, distortion of the teeth upon imbedment into the member sometimes occurs as the teeth on opposite sides of the fastener are offset one from the other creating a transverse shearing force on the waist or body portion of the fastener.

The present invention provides a fastener which minimizes the above discussed and other shortcomings of prior fasteners and provides various advantages in construction, mode of use, and result over such prior fasteners. Particularly, the present invention provides a fastener comprised of an elongated sheet metal body having a plurality of longitudinally spaced teeth extending in opposite lateral directions and generally in the plane of the body. The edges of the teeth extend outwardly parallel one to the other. The teeth have tip portions terminating in pointed ends which are bent out of the plane of the sheet metal fastener to one side thereof. The double-ended fastener hereof is preferably arranged in the form of a ringlet with the end teeth overlapping one another to provide added strength upon embedment into the joint members.

To form the joint, the fastener is disposed between a pair of joint members, for example a stud and a sheet of plywood, and at least one of the joint members is pressed toward the other to imbed the teeth into the respective members, i.e., the stud and plywood panel, until final securement is obtained with the opposite faces of the stud and panel lying in butting relation.

By employing the foregoing described fastener and tooth configuration, not only is effective penetration of the teeth into the opposite members of the joint obtained, but a high resistance to withdrawal is also provided whereby the members of the joint cannot be readily separated. In the first instance, the teeth on one side of the fastener form columnar extensions of, and lie in lateral alignment with, the corresponding teeth on the other side of the fastener whereby the axial loads on the teeth upon imbedment into the joint members and in response to separating movement of the joint members are not transferred to the body portion of the fastener. Thus, distortion or tearing of the fasteners, particularly at their body portions, is precluded. Secondly, by forming the fastener into a ringlet with the tip portions of the teeth inclined outwardly of the ringlet, the teeth on opposite sides of the fastener tend to bend outwardly upon embedment thereby providing a clinching action in each of the joint members i.e., the stud and paneling, when finally secured one to the other. Thus, the resistance to withdrawal of the teeth in the finally secured members is very high.

A further feature of the present invention resides in the formation of shoulder portions between the adjacent teeth on each side of the fastener which, when the fastener is fully imbedded into the adjoining members, form with the teeth a continuous groove in the jointed members. That is to say, a continuous portion of the sheet metal of the fastener is imbedded in each of the joined members and hence lies at the joint interface. Accordingly, shearing action between the joined members is applied to and resisted by the uninterrupted continuous sheet metal body portion.

Moreover, by providing this continuous intermediate body portion, the extent of penetration on each side of the fastener is controlled such that the continuous metal body portion is always located at the interface of the joint members regardless of the relative hardness of the members of the joint, and other factors. For example, to form a joint between a stud and plywood paneling having different hardnesses, the teeth imbedded into the softer member will necessarily be imbedded to their full extent prior to full imbedment of the teeth entering the harder wood. However, the resistance to further insertion of the fastener into the softer wooden member is substantially increased when the shoulder portions of the body portion of the fastener engage the softer member. This combined resistance of the teeth and waist portion to imbedment in the softer member is sufficiently greater than the resistance to imbedment of the teeth entering the harder wood such that the latter teeth are then fully imbedded into the harder wood upon further pressing of the joint members toward one another. When all of the teeth are fully imbedded into the adjoining members, further pressing of the members toward one another imbeds the waist or body portion of the fastener into the members, thereby forming a continuous groove in each member and locating a continuous sheet metal portion of the fastener at the interface of the joint. In this manner, a continuous sheet of metal is located at the joint interface and this increases the load carrying capability of the joint, particularly in shear.

It is a further feature of the present invention that sheet paneling can be readily applied to studs or the like. By starting the ring fastener in one of the members of the joint, for example, the studs, at spaced positions therealong, the sheet paneling can then be applied against the projecting ringlets on the studding. By hammering the sheet paneling, as by a rubber-tipped hammer along its outer face, the ring fastener will be simultaneously imbedded into both the stud and the rear face of the paneling. As the paneling is hammered to final securement in butting relation against the studs, the clinching action of the fastener automatically is effected and the body or waist portion of the fastener is also automatically located at the interface between the paneling and the stud. Thus, merely by starting the fasteners in one of the joint members, placing the other joint member against the fasteners, and hammering the other joint member toward the first joint member, a joint effective under significant shear and withdrawal loadings can be effected.

Accordingly, it is a primary object of the present invention to provide an improved fastener for joining butting members one to the other.

It is another object of the present invention to provide an improved double-ended hidden fastener for joining butting wooden members and which fastener has high resistance to withdrawal in the members.

It is still another object of the present invention to provide a double ended hidden fastener for joining butting members and which provides an optimum load-carrying capability in shear.

It is a further object of the present invention to provide a double-ended hidden fastener which is readily and easily imbedded into the adjoining members and which is free of distortion upon imbedment.

It is a still further object of the present invention to provide a double-ended hidden fastener of the type useful for joining sheet paneling to studding.

It is a still further object of the present invention to provide a double ended hidden fastener of the type having a plurality of elongated teeth projecting laterally in opposite directions therefrom and which can be readily and easily manufactured at low cost and without waste of sheet metal material.

It is a still further object to provide a joint employing a hidden fastener of the type having the foregoing characteristics.

These and further objects and advantages of the present invention will become more apparent upon reference to the following specification, claims, and appended drawings, wherein:

FIG. 1 is a fragmentary perspective exploded view of a wall panel secured to a pair of studs by means of a double ended fastener constructed in accordance with the present invention;

FIG. 2 is an elevational view of the double-ended fastener hereof;

FIG. 3 is an enlarged cross-sectional view of the double ended fastener in the form of a ringlet;

FIG. 4 is a fragmentary cross-sectional view taken generally about on line 4-4 of FIG. 3;

FIG. 5 is a fragmentary enlarged view of a joint formed with the double-ended fastener hereof; and FIG. 6 is an enlarged perspective view of the double-ended fastener hereof illustrating its ringletlike shape with the end teeth overlapping one another.

Referring now to the drawings and particularly to FIG. 1, there is shown a pair of studs 10 on the outer faces of which and at spaced positions therealong have been started a plurality of double-ended fasteners constructed in accordance with the present invention and generally indicated at 12. The fasteners are employed, as illustrated, to secure the sheet paneling 14 against studs 10, it being appreciated that the fasteners 12 may comprise the sole means of securement between panel 14 and studs 10. The studs 10 are, of course, formed of wood and the sheet panel may be comprised of laminated sheets of wood otherwise known as plywood, other paneling for example wallboard, or other members capable of receiving a nail. The fasteners 12 are of the double-ended type and, as clearly seen in FIG. 1, the opposite ends of fasteners 12 are embedded into the front and rear faces of the respective studs 10 and paneling 14 securing the same in butting face to face relation one with the other with the fastener being hidden from view in the finally assembled joint.

Referring now particularly to FIG. 2, the fastener 12 is comprised of sheet metal material formed to provide a body or waist portion 16 having a plurality of longitudinally spaced teeth 18 extending from waist or body portion 16 in opposite directions and generally in the plane of body portion 16. As seen in FIG. 2, body portion 16 and teeth 18 are struck integrally from an elongated blank of sheet metal, preferably 20 U.S. standard gauge galvanized steel. Shoulders 20 are provided on opposite sides of the base portions of teeth 18 whereby shoulder portions 20 on opposite sides of each tooth form lateral facing edges. The edges of shoulders 20 extend linearly and the edges of the shoulders of each pair of next adjacent teeth on each side of waist portion 16 meet at an apex indicated at 22. Teeth 18 are struck such that the spaces 24 between adjacent teeth on opposite sides of body 16 have a width equal to the width of teeth 18 with the shoulders 20 between adjacent teeth having a configuration complementary to the pointed tip portions 26 of the teeth. Particularly, the tip portion 26 of each tooth has a pointed end formed by edges which extend from the side edges of the tooth linearly to the pointed end. The edges of the tip portions 26 are complementary in shape to the edges of the shoulders 20 of next adjacent teeth on each side of waist portion 16. In other words, the space 24 between adjacent teeth and defined by the edges of such adjacent teeth and the shoulders have an outline identical to teeth 18 whereby the teeth of laterally adjacent strips, indicated by the dot-dash lines in FIG. 2, struck from the same sheet metal blank lie, in effect, in meshing engagement and longitudinally offset one from the other a full tooth width.

As seen in FIG. 2, the teeth 18 on each side of the body portion 16 lie in lateral alignment with the corresponding teeth on the opposite side of body portion 16 whereby the teeth on each side form extensions of the corresponding teeth on the other side of the fastener. Thus, the loadings in tension, that is the resistance to withdrawal, is transferred from the teeth on one side of the fastener to the corresponding teeth on the other side of the fastener thereby avoiding significant shear stresses in waist portion 16 which might otherwise rupture or deform the fastener upon embedment into the butting members forming the joint.

It is a further significant feature hereof that tip portions 26 on each side of the fastener are bent out of the plane of the teeth on like sides thereof at an angle indicated at e in FIG. 3. As hereinafter amplified, the fastener is preferably bent in the form of a ring or ringlet with the end teeth of the fastener lying in overlapping relation one to the other as best seen in FIG. 5 and with the tip portions 26 bent outwardly of the ringlet. It will therefore be appreciated that as the fastener is embedded into each of the butted members of the joint, the bent tip portions 26 tend to bend the corresponding tooth outwardly providing a circular clinching action in the wood as best illustrated in FIG. 5. It has been found that by forming the fastener into a ringlet with the teeth at opposite ends of the fastener disposed in overlapping relation one to the other, the end nails are effective to retain the circular configuration of the fastener as it is embedded into the members of the joint.

In use, the fastener strips or ringlets are first started in one of the members of the joint. Particularly, and as seen in FIG. 1, the teeth on one side of the ringlets are started in the faces of the studs 10. With the fastener ringlets thus disposed, panel 14 is positioned and pressed against the teeth on the other side of ringlets 12 such as that the teeth on opposite sides of body portion 16 are started into the respective members. By hammering about the outer face of panel 14 as by a hammer, not shown, the teeth on the opposite sides of the fastener are fully embedded into the respective studs and panel. Note that the loading carried by the teeth on one side of body portion 16 upon embedment thereof into the associated member of the joint is transferred axially along the tooth through the body portion 16 to the corresponding tooth 18 on the other side of body portion 16. Thus, the axial loadings on the teeth each side of the fastener are transferred directly to the teeth on the other side of the fastener whereby the body portion is not subjected to shear loadings and hence not distorted or deformed in use.

As panel 14 is pressed or hammered toward final securement into butting face-to-face relation with studs 10, the shoulder portions 20 between adjacent teeth on each side of body portion 16 engage and are embedded into the opposed faces of the stud and panel whereby such shoulder portions cooperate with the teeth 18 to form a continuous groove in each of the members. In other words, a continuous band of metal comprising the body portion 16 of the fastener is embedded into the joint members and lies at the interface thereof. This is significant as any shear load between the joint members at their interface is applied to and carried by the continuous sheet metal body.

Furthermore, as teeth 18 are pressed into the butting faces of the stud and panel, the tip portions 26 tend to bend the teeth on each side of body 16 outwardly to form the generally concave appearance in cross section as seen in FIG. 4. This provides a significant increase in the resistance to withdrawal of the fastener in both members of the joint, whereby separating action of the joint members is effectively resisted.

It is further significant that the body portion 16 will always be located at the joint interface and not wholly disposed in one or the other of the joint members notwithstanding differences in the degree of hardness of the joint members. Where the joint members are of different hardness, it will be appreciated that under normal conditions, the teeth embedded into the softer member of the joint will be embedded for their full length prior to full embedment of the teeth on their full length prior to full embedment of the teeth on the opposite side of the fastener into the harder joint member. The shoulders 20 of body 16 however prevent the asymmetrical location of body 16 relative to the joint members. In other words, shoulders 20 operate to locate the body portion 16 at the joint interface with the shoulders embedded substantially equal distances into the associated members of the joint, thus disposing a continuous band of metal across the joint interface. It will be appreciated that when the shoulders 20 on one side of the fastener engage the face of the associated member of the joint, the resistance to further insertion of the fastener into such joint member is substantially increased. This substantial increase in resistance permits the further insertion of the tooth on the opposite side of the fastener into the other joint member whereby further relative movement between the joint members toward one another embeds the teeth on each side of the fastener up to the respective shoulders substantially prior to embedment of the shoulders on either side of the fastener into the respective joint members. Thus, regardless of the differing hardness of the members of the joint, body 16 will always be located as to intersect and thereby provide a continuous band of metal at the joint interface.

In a preferred form hereof, the teeth including the shoulder portions are flat in cross section as illustrated in FIG. 4. When the fastener hereof is formed into the ringlet, it is bent about fold lines extending from the apices 22 on one side of body portion 16 and the corresponding apices 22 on the other side of the body 16. That is to say, the teeth are bent about the narrowest portions of the waist portion 16. In this fashion, a substantial polygon is formed with each of the teeth being flat and cross section.

In a preferred embodiment hereof the fastener strips are formed of 20 U.S. standard gauge galvanized sheet metal steel although other metal thicknesses could be employed if preferred, for example, 18 U.S. standard gauge galvanized sheet metal. Each tooth has an overall length from tip to tip of 0.625 inches and a tooth width of 0.130 inch. The width of the body portion 16 from the apex 22 on one side to the corresponding apex 22 on the opposite side is 0.109 inch with the length of the teeth on each side of the fastener including shoulders 20 being 0.258 inch. It will therefore be seen that the ratio of the body portion width to the length of each tooth is 0.42 and should be no greater than 1. The ratio of the body portion width between corresponding apices 22 and the overall tooth length from tip to tip is 0.17 and should be no greater than 0.33 to ensure adequate clinching. Inasmuch as laterally adjacent fasteners struck from the same sheet metal blank are complementary one to the other, the spacing 24 between adjacent teeth 18 is also 0.130 inches. The tip portion 26 is bent outwardly at an angle $e$ about an axis spaced inwardly from the tip of the tooth a distance of 0.125 inch. The angle $e$ is preferably about 10°. The teeth have an overall length to width ratio of 4.8 with the length to width ratio of the teeth on one side of the fastener including shoulders 20 being 1.9. The former ratio should be no less than 3.5 and the latter ratio should be no less than 1.5.

What I claim and desire to be secured by U.S. Letters Patent is:

1. A fastener for forming a butt joint between a pair of members comprising an elongated sheet metal plate having a longitudinally extending continuous body portion and a plurality of longitudinally spaced, elongated teeth extending in opposite lateral directions normal to the longitudinal axis of said body portion and generally in the plane thereof for embedment into the respective members, the teeth extending laterally on one side of said body portion lying in axial alignment with the teeth extending laterally on the other side of said body portion, said teeth having substantially parallel side edges, the overall length to width ratio of each coaxially aligned pair of teeth being no less than about three, the ratio of the width of said body portion to the length of said teeth on each side of said body being no greater than about 1, said teeth including shoulders adjacent the base portions of said teeth on opposite sides of said body portion for embedment into the butting faces of the respective members.

2. A fastener according to claim 1 wherein said teeth have tip portions, said tip portions being bent to project out of the plane containing said sheet metal body and said teeth.

3. A fastener according to claim 1 wherein said sheet metal body portion is bent about an axis parallel to the axes of said teeth such that planes containing the axes of a next adjacent pair of teeth intersect one another to form an included angle.

4. A fastener according to claim 3 wherein said sheet metal body portion is arcuately bent.

5. A fastener according to claim 3 wherein said sheet metal plate is bent about axes parallel to the axes of said teeth to form a substantial polygon, said parallel axes lying between said teeth.

6. A fastener according to claim 1 wherein the space between adjacent teeth on each side of said body portion is at least as wide as the width of said teeth.

7. A fastener according to claim 1 wherein said shoulders lie on opposite sides of each of said teeth.

8. A fastener according to claim 7 wherein the side edges of the shoulders on each of said teeth extend linearly from a point intermediate the length of said teeth to said body portion, the side edges of the nearer shoulders of adjacent teeth intersecting one another at an apex in said body portion.

9. A fastener according to claim 7 wherein the side edges of the shoulders on each of said teeth extend linearly from a point intermediate the length of said teeth to said body portion, the side edges of the nearer shoulders of adjacent teeth intersecting one another at an apex in said body portion, said sheet metal plate being bent about axes parallel to the axes of said teeth to form a substantial polygon, said parallel axes lying between said teeth, said teeth having tip portions bent to project out of the plane containing said sheet metal body and said teeth.

10. A fastener for forming a butt joint between a pair of members comprising an elongated sheet metal plate having a longitudinally extending continuous body portion and a plurality of longitudinally spaced, elongated teeth extending in opposite lateral directions normal to the longitudinal axis of said body portion and generally in the plane thereof for embedment into the respective members, the teeth extending laterally on one side of said body portion lying in axial alignment with the teeth extending laterally on the other side of said body portion, said teeth having substantially parallel side edges, the overall length to width ratio of each coaxially aligned pair of teeth being no less than about three, said teeth including shoulders adjacent the base portions of said teeth on opposite sides of said body portion for embedment into the butting faces of the respective members, said teeth having tip portions bent to project out of the plane containing said body portion and the associated tooth.

11. A fastener according to claim 10 wherein said sheet metal body portion is bent about an axis parallel to the axes of said teeth such that planes containing the axes of a next adjacent pair of teeth intersect one another to form an included angle.

12. A fastener according to claim 10 wherein the ends of said teeth are pointed.

13. A fastener according to claim 10 wherein said shoulders lie on opposite sides of each of said teeth, the side edges of the shoulders on each of said teeth extend linearly from a point intermediate the length of said teeth to said body portion, the side edges of the nearer shoulders of adjacent teeth intersecting one another at an apex in said body portion, the space between adjacent teeth on each side of said body portion being at least as wide as the width of said teeth.

14. A joint comprising a pair of members having opposite faces in butting relation, a fastener for retaining said members in face-to-face butting relation comprising an elongated sheet metal plate having a longitudinally extending continuous body portion and a plurality of longitudinally spaced, elongated, teeth extending in opposite lateral directions normal to the longitudinal axis of said body portion and generally in the plane thereof, the teeth extending laterally on one side of said body portion lying in axial alignment with the teeth extending laterally on the other side of said body portion, said teeth having substantially parallel side edges, the overall length to width ratio of each coaxially aligned pair of teeth being no less than about three, the teeth on one side of said body portion being embedded into one of said members and the teeth on the other side of said body portion being embedded into the other of said members, said body portion including shoulder portions between each of said teeth on opposite sides of said body portion, the shoulder portions on each side of said body portion lying in a common plane extending normal to said plate and parallel to said axis, said planes lying in laterally spaced parallel relation one to the other, said shoulder portions and said teeth being embedded into the associated members such that said body portion extends into each member to provide a continuous metal sheet portion along the interface of said members throughout the length of said fastener.

15. A joint according to claim 14 wherein said sheet metal body portion is bent to form an arcuate configuration about an axis generally parallel to the longitudinal axes of said teeth.

16. A joint according to claim 15 wherein said fastener comprises a ringlet with the teeth extending in directions generally parallel to the axis of the ringlet.

17. A joint according to claim 14 wherein said members comprise a stud and a sheet of panelling, a plurality of fasteners each of said plurality of fasteners being formed in a manner identical to that of the fastener recited in claim 14, said fasteners being spaced one from the other along said stud and along the butting face portion of said panel.

UNITED STATES PATENT OFFICE
CERTIFICATE OF CORRECTION

Patent No. 3,591,210      Dated July 6, 1971

Inventor(s) RICHARD E. HEISE

It is certified that error appears in the above-identified patent and that said Letters Patent are hereby corrected as shown below:

The name of the inventor reading "Ricahrd E. Heise" should read --Richard E. Heise--.

In Column 4, line 42, "such as that" should read --such that--.

In Column 5, lines 8 and 9, cancel "on their full length prior to full embedment of the teeth".

Signed and sealed this 16th day of May 1972.

(SEAL)
Attest:

EDWARD M. FLETCHER, JR.
Attesting Officer

ROBERT GOTTSCHALK
Commissioner of Patents